United States Patent
Lonstein et al.

(10) Patent No.: US 10,404,706 B2
(45) Date of Patent: *Sep. 3, 2019

(54) METHODS AND SYSTEMS FOR DETECTING, VERIFYING, PREVENTING AND CORRECTING OR RESOLVING UNAUTHORIZED USE OF ELECTRONIC MEDIA CONTENT

(71) Applicants: Wayne D. Lonstein, Ellenville, NY (US); Julie C. Lonstein, Ellenville, NY (US)

(72) Inventors: Wayne D. Lonstein, Ellenville, NY (US); Julie C. Lonstein, Ellenville, NY (US)

(73) Assignees: Wayne D. Lonstein, Ellenville, NY (US); Julie C. Lonstein, Ellenville, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/621,922

(22) Filed: Jun. 13, 2017

(65) Prior Publication Data

US 2017/0279809 A1   Sep. 28, 2017

Related U.S. Application Data

(63) Continuation of application No. 13/831,006, filed on Mar. 14, 2013, now Pat. No. 9,712,531.

(51) Int. Cl.
*H04L 29/06* (2006.01)
*G06Q 50/18* (2012.01)
(Continued)

(52) U.S. Cl.
CPC .............. *H04L 63/10* (2013.01); *G06F 21/10* (2013.01); *G06F 21/552* (2013.01); *G06Q 50/184* (2013.01)

(58) Field of Classification Search
CPC ........ H04L 9/32; H04L 63/101; H04L 63/107
(Continued)

(56) References Cited

U.S. PATENT DOCUMENTS 7,634,419 B1 * 12/2009 Travis ................... G06F 19/322
                                                                  705/2
8,341,141 B2 * 12/2012 Krislov .................. G06Q 50/18
                                                                  707/707
(Continued)

*Primary Examiner* — Lynn D Feild
*Assistant Examiner* — Viral S Lakhia
(74) *Attorney, Agent, or Firm* — Steve Hassid, Esq.; Partners Law Group, Inc.

(57) ABSTRACT

A method of detecting, verifying, preventing and correcting or resolving unauthorized use of electronic media content. In one embodiment, the method comprises providing an electronic system that allows auditors to register to audit the use of electronic media content, providing the auditors with information through the electronic system regarding a unique identifier that identifies one or more items of electronic media content, owners of electronic media content or other intellectual property or users who have subscribed to the use of electronic media content, obtaining information from auditors through the electronic system regarding unauthorized use of the electronic media content and verifying that the information received from auditors is complete.

17 Claims, 10 Drawing Sheets

(51) Int. Cl.
  *G06F 21/10* (2013.01)
  *G06F 21/55* (2013.01)
(58) Field of Classification Search
  USPC .................................................. 726/25–35
  See application file for complete search history.

(56) References Cited

U.S. PATENT DOCUMENTS

| | | | | |
|---|---|---|---|---|
| 2001/0051996 | A1* | 12/2001 | Cooper | G06Q 10/10 709/217 |
| 2005/0010764 | A1* | 1/2005 | Collet | G06F 21/10 713/165 |
| 2005/0071185 | A1* | 3/2005 | Thompson | G06Q 10/10 705/317 |
| 2007/0241176 | A1* | 10/2007 | Epstein | G06F 21/10 235/375 |
| 2009/0048950 | A1* | 2/2009 | Howell | G06Q 10/06 705/30 |
| 2009/0080649 | A1* | 3/2009 | Dellow | H04L 9/0637 380/44 |
| 2009/0287837 | A1* | 11/2009 | Felsher | G06F 19/328 709/229 |
| 2010/0156630 | A1* | 6/2010 | Ainsbury | G07C 9/00103 340/540 |
| 2010/0325649 | A1* | 12/2010 | Anguiano | H04N 21/2541 725/25 |
| 2013/0174223 | A1* | 7/2013 | Dykeman | G06F 21/10 726/4 |
| 2013/0227293 | A1* | 8/2013 | Leddy | H04L 9/32 713/176 |
| 2014/0208102 | A1* | 7/2014 | Pryakhin | G06F 21/62 713/165 |

* cited by examiner

METHODS AND SYSTEMS FOR DETECTING, VERIFYING, PREVENTING AND CORRECTING OR RESOLVING UNAUTHORIZED USE OF ELECTRONIC MEDIA CONTENT

CLAIM OF BENEFIT TO PRIOR APPLICATIONS

This application is a continuation application of U.S. Patent Application 13/831,006, filed Mar. 14, 2013, now published as U.S. Patent Publication 2014/0283123, both of which are incorporated herein by reference in their entirety.

FIELD OF THE DISCLOSURE

The present invention generally relates to method for detecting, verifying, preventing and correcting or resolving unauthorized use of electronic media content. More particularly, the present invention detects unauthorized use of electronic media content by allowing any registered user to collect and submit evidence of the unauthorized use, and correct misuse which prevents further unauthorized use of electronic media content and acts as a deterrent for those contemplating unauthorized use.

BACKGROUND

Unauthorized use of electronic media content, which includes signal theft or piracy, usually occurs when a business or individual uses the electronic media content without subscribing to the electronic media content provider, such as using an unauthorized receiver or a computer to access and steal the electronic media content. Unauthorized use of media or violation of terms of use is often accomplished when a customer, who at one time subscribed to a specific type of the service, uses the electronic media content for another unauthorized user. Others alter their receiver to continue to receive unauthorized electronic media content even after ending their subscription or use the electronic media content without lawful subscription or permit.

Using an electronic media content that exceeds viewers' licensing terms is also a prevalent form of unauthorized use of electronic media content. For instance, some businesses subscribe to electronic media content under personal or residential use but use the electronic media content commercially. Those businesses, entities or individuals unjustly benefit from the unauthorized use because they access, view, exhibit and/or transmit the media content to others without obtaining authorization from the content owner or paying the required licensing fees to the content provider. There are also individuals or businesses who applied to the use of an electronic media content for one particular license, location or device but actually use the electronic media content in multiple locations or devices without subscribing for that actual usage or license. This can happen when a subscriber uses a multi-receiver to receive the electronic media content at multiple locations; when the subscriber uses media mirroring device (i.e., Slingbox® or other place shifting devices or technology) to mirror the electronic media content and use the electronic media content at unauthorized location; or when the subscriber shares his media subscription account and/or password with others without authorization.

Electronic media content providers often cannot efficiently identify end users who illegally use their electronic media content because their system is incapable of detecting the unauthorized use (i.e., one way broadcasting system such as satellite TV, cable tv, terrestrial radio telephone, fiber optic) or because they do not have enough resources to hire sufficient auditors to investigate the unauthorized use. Even if their systems/methods have such functionality, the systems/methods still cannot differentiate whether the electronic media content is being used residentially or commercially. It is also expensive to hire private investigators, federal marshal, or auditors, often at hourly rate, and may take a long time for them to find out the individuals or businesses that exist throughout the country that are using electronic media content without authorization or to collect evidences of the unauthorized use. Other methods include using expensive and often inaccurate internet, GPS, or GIS predictive models or technology that does not positively identify unauthorized misuse but only tries to predict an increased possibility of unauthorized use of electronic media content for the content providers. Moreover, content providers are often concerned with the negative stigma, press, potential backlash and possibly legal consequences from trying to enforce their legal rights and prevent members of the public from unauthorized use of their electronic media content.

Accordingly, there exists a need for improved method which not only allows electronic media content providers and owners to detect, verify and correct unauthorized use of their electronic media content more efficiently, but also allows them to lawfully collect evidence of the unauthorized use, thereby protecting their interests and business model and preventing unauthorized use of electronic media content.

SUMMARY OF THE INVENTION

The present invention discloses a method for detecting, verifying, preventing and correcting or resolving unauthorized use of electronic media content which allows electronic media content providers or owners, and related parties and intermediaries to efficiently discover whether a user is licensed to use electronic media content or whether the user is using the electronic media content consistently with its licensing terms. The method further allows the electronic media content providers to collect evidence of the unauthorized use more expediently.

In one embodiment of the present invention, a method of detecting, verifying, preventing and correcting or resolving unauthorized use of electronic media content is provided. The method comprises (1) providing an electronic system that allows one or more auditors to register to audit the use of electronic media content; (2) providing the one or more auditors with information through the electronic system regarding a unique identifier that identifies one or more items of electronic media content, one or more owners of electronic media content or one or more users who have subscribed to use one or more items of electronic media content; (3) obtaining information from the one or more auditors through the electronic system regarding unauthorized use of one or more items of electronic media content and (4) verifying that the information received from the one or more auditors through the electronic system regarding the unauthorized use of one or more items of electronic media is complete.

In one aspect of at least one embodiment of the present disclosure, the electronic system used can be a website, an internet application, a computer software application, a mobile software application or other similar technology.

In another aspect of at least one embodiment of the present disclosure, the auditor can be any individual or business entity that has access to the electronic system including, but not limited to, mobile users who have installed the mobile application for the electronic system or users who have registered with the electronic system. The registration of the auditor may require the auditor to provide evidence that he or she is suitable to be an auditor. The electronic system can be any means of transmitting electronic information, including but not limited to, the internet, mobile/telephonic devices, satellite and radio communication.

In yet another aspect of at least one embodiment of the present disclosure, the electronic system obtains information regarding the location of one or more auditors based on IP address or GPS location of them and notifying the auditors within a specific geographic location of special watch events. For instance, if there is a special sporting event (i.e., Super Bowl®) and the event is being broadcasted on TV only at certain region, the electronic system will alert auditors in proximity to that region to pay attention to individual or business playing the special event on TV. In another example, and not by way of limitation, the system and method of the present invention would notify the auditor of local media contents (e.g., a specific sporting event, geographically restricted content, content that is not supposed to be viewed or accessed at a later or earlier time, or content that is sent to a particular person or business) that should or should not be displayed at that particular location in order to assist the auditor with determining whether a media content is being used without authorization.

In yet another aspect of at least one embodiment of the present disclosure, the electronic system provides auditors with a list of authorized users of the media content within the auditors' area. In yet another aspect of at least one embodiment of the present disclosure, the list is incorporated into a mobile application or software that the auditor can use to help determine unauthorized use of electronic media content.

In yet another aspect of at least one embodiment of the present disclosure, there can be numerous ways where auditors can verify whether an individual or business has the authorization to use the electronic media content. In yet another aspect of at least one embodiment of the present disclosure, the electronic system provides auditors with geographic locations or ranges of the electronic media content. In yet another aspect of at least one embodiment of the present disclosure, when the auditors see that an electronic media content is being used outside of its geographic locations or ranges, the auditors can immediately tell that the use of the electronic media content is likely unauthorized. In yet another aspect of at least one embodiment of the present disclosure, the auditors can then confirm their findings with the electronic system.

In yet another aspect of at least one embodiment of the present disclosure, the auditors identifies the source of electronic media content through unique identifier such as digital signature, digital fingerprint, watermark, pixilation, banner or any other identifying indicia embedded in the electronic media content. In yet another aspect of at least one embodiment of the present disclosure, once the source of an electronic media content is identified, the auditors can access the electronic system to verify whether the person or business using the electronic media content has the authorization or correct license to do so.

In yet another aspect of at least one embodiment of the present disclosure, if the auditors determine that an unauthorized use of electronic media content has occurred, the auditors can submit the evidence of the unauthorized use in various forms and means to the electronic system. For instance, in one aspect of at least one embodiment of the present invention, the auditors can take photos or videos of the unauthorized use and upload them to the electronic system through its website, web application, mobile application, or other similar technology. In yet another aspect of at least one embodiment of the present disclosure, the electronic system also allows the auditors to provide detail information regarding the unauthorized use, such as identity of individual or business using the electronic media content, or specific location and time of the unauthorized use. In yet another aspect of at least one embodiment of the present disclosure, if auditors do not provide this information, the electronic system may still be able to determine them based on the IP address or GPS location of the auditors and the time auditors accessed the electronic system or took the photos or videos.

In yet another aspect of at least one embodiment of the present disclosure, if graphical evidence is not available, the auditors can simply provide textual or voice description of the unauthorized use to the electronic system. In yet another aspect of at least one embodiment of the present disclosure, the electronic system may provide special forms for auditors to fill out such as forms asking auditors to provide specific date, time, location and description of the unauthorized use of electronic media content.

In yet another aspect of at least one embodiment of the present disclosure, when the electronic system receives the evidence from auditors, the electronic system can automatically compile the evidence into a legal document (i.e., affidavits or declaration of auditors). In yet another aspect of at least one embodiment of the present disclosure, the auditors can sign the generated legal document electronically if the jurisdiction allows digital signature, or the auditors can submit notarized copy of the legal document when required. In yet another aspect of at least one embodiment of the present disclosure, the electronic media content providers can then use the legal document against unauthorized electronic media content users. In yet another aspect of at least one embodiment of the present disclosure, if the identity or contact information of the unauthorized electronic media content users is known, the electronic system may also send message (i.e., text message, email, mail, etc.) to the unauthorized electronic media content users warning them of the unauthorized use and requesting them to pay the required licensing fee and/or penalty to avoid legal actions. In yet another aspect of at least one embodiment of the present disclosure, upon discovery of unauthorized use of a media content, a warning message is delivered or streamed with the media content to the individual using the media content requiring the individual to either cease the use of content and/or pay the necessary fees.

In yet another aspect of at least one embodiment of the present invention, the method further includes providing an incentive, payment or award to the auditor for correctly identifying and documenting unauthorized use of electronic media content.

In another aspect of at least one embodiment of the present disclosure, the electronic system tracks progress of the audits performed by the auditors and periodically reminds the auditors to complete tasks required by the auditing process.

In yet another aspect of at least one embodiment of the present invention, the method further includes the method described herein except that the user does not need to register or provide any identifying information.

Since the method of the present invention allows anyone in the public to be a potential auditor and compensates the auditor when an evidence of unauthorized use of electronic media content is properly received, the present invention greatly increases the efficiency and incentive of detecting and reporting unauthorized use of electronic media content. Thus, individual or business will also less likely to use electronic media content without authorization because of the high probability of getting detected. In addition, when the individual or business sees detail evidence of their wrongdoing, it will prompt them to pay the required licensing fees or to settle the case with the electronic media content providers. Thus, any unauthorized use of media content can be easily corrected and resolved.

These and other features, aspects and advantages of the present invention will become better understood with reference to the following drawings, description and claims.

DETAILED DESCRIPTION OF THE INVENTION

The following description is not to be taken in a limiting sense, but is made merely for the purpose of illustrating the general principles of the invention, since the scope of the invention is best defined by the following claims. Various inventive features are described below that can each be used independently of one another or in combination with other features.

Broadly, embodiments of the present invention generally provide a method of detecting, verifying, preventing and correcting or resolving unauthorized use of electronic media content by providing an electronic system that allows one or more auditors to register to audit the use of electronic media content, providing the one or more auditors with information through the electronic system regarding a unique identifier that identifies one or more items of electronic media content, one or more owners of electronic media content or one or more users who have subscribed to use one or more items of electronic media content, obtaining information from the one or more auditors through the electronic system regarding unauthorized use of one or more items of electronic media content and verifying that the information received from the one or more auditors through the electronic system regarding the unauthorized use of one or more items of electronic media is complete. For the purposes of this disclosure, an auditor is any individual or entity that detects, verifies, prevents, corrects and/or resolves the unauthorized use of electronic media content. For purposes of the present disclosure, media content shall include content, in any form and type, that is or can be protected through law or otherwise. Examples of electronic media content include but are not limited to passwords, key codes, licenses shares, software, video, music, membership accounts, writings, and any other literary, musical, or artistic work presently available or created in the future that can be stored, access, download or transmit through any electronic device.

Figure 1:
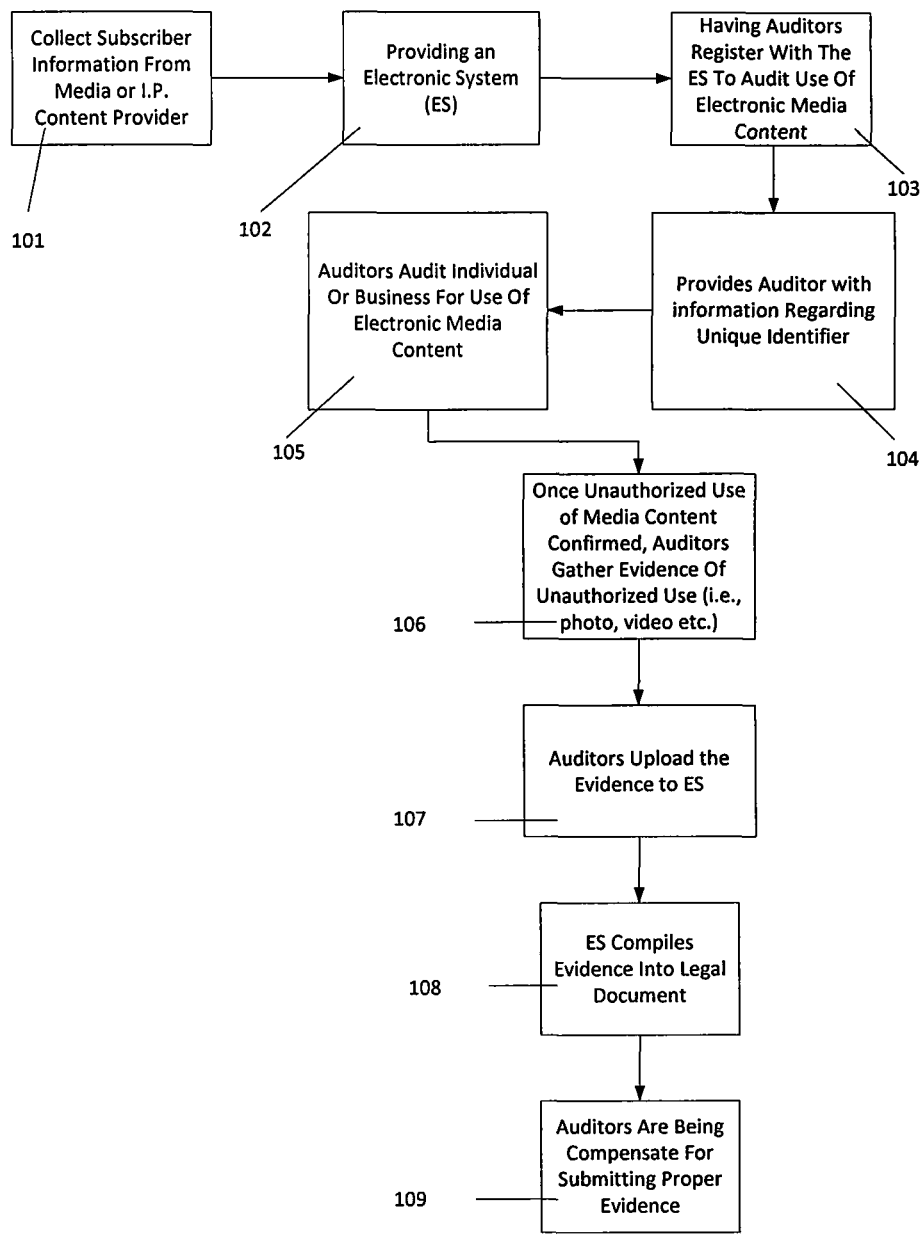
FIG. 1 is a process flow diagram showing an exemplary embodiment of the present invention.

Referring to FIG. 1, a process flow diagram showing an exemplary embodiment of the present invention. In one aspect of at least one embodiment of the present invention, the method for detecting, verifying, preventing and correcting or resolving unauthorized use of electronic media content first collects subscriber information from electronic media content providers 101. In one aspect of at least one embodiment of the present invention, an electronic system is provided 102 that allows one or more auditors to register to audit the use of electronic media content 103. The auditors can be anyone in the public which also include, but not limited to, company employee, third party or independent contractor. The electronic system can be a website, an internet application, a computer software application, a mobile software application, other similar technology or any combination of them, where all of them can provide functions similar to each other. The electronic system allows any individual or business to register with the system and become an auditor. There are various ways that an individual can register with the electronic system. For instance, and not by way of limitation, the individual can be automatically registered when the individual installed the application or software provided by the electronic system (i.e., computer software, mobile device application, etc.) or the individual can register with the electronic system through the website provided by the electronic system. The registration may require the auditor to provide evidence that he or she is suitable to be an auditor to prevent people with criminal history or dishonest conduct from becoming auditors. In one aspect of at least one embodiment of the present invention, the registration requirement can be optional where everyone can have access to the electronic system.

The electronic system then provides the auditor with information through the electronic system regarding a unique identifier that identifies one or more items of electronic media content, one or more owners of electronic media content or one or more users who have subscribed to use one or more items of electronic media content 104. For instance, the information can include which individual or business has subscribed to the electronic media content providers' services and the type of license (i.e., residential or commercial) for each subscriber. Such information can be stored on or accessed through the electronic system. If the electronic media content providers cannot provide subscriber's information due to confidentiality agreement with the subscriber, the electronic system can also serve as a gateway between electronic media content providers and auditors.

Figure 2:
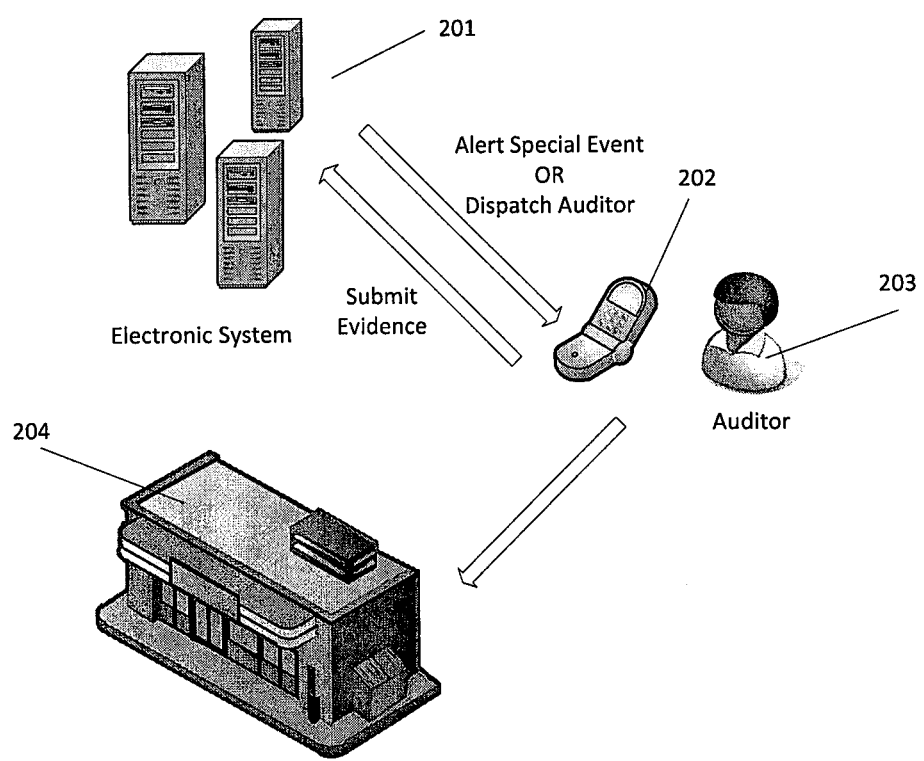
FIG. 2 is an exemplary embodiment of the present invention showing how the electronic system provides information to an auditor.
Figure 8:
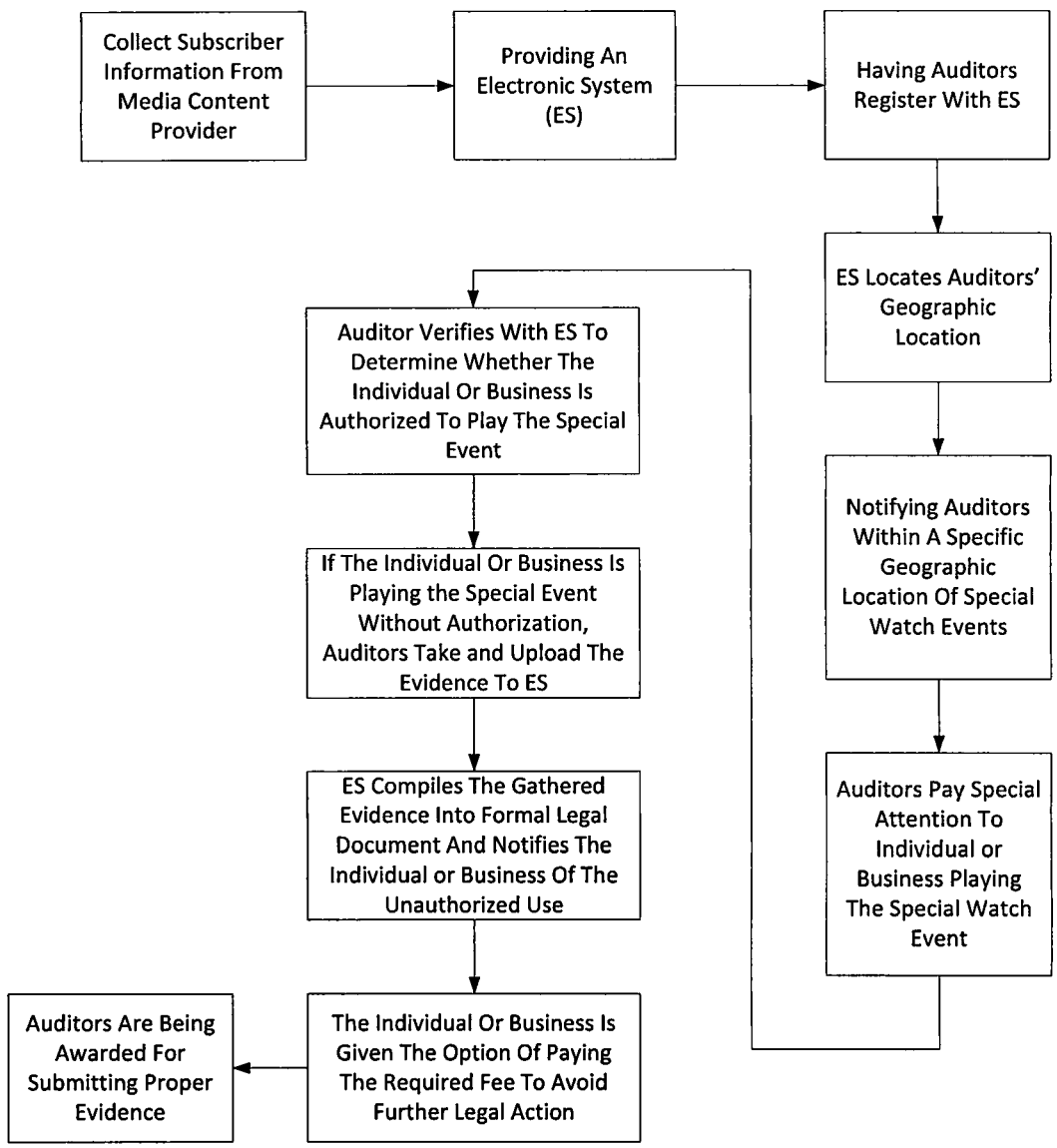
FIG. 8 is a process flow diagram showing how the notification system can assign auditor based on his or her location.

Once an individual becomes an auditor of the electronic system, the electronic system will interact with the auditor in various ways. Referring to FIG. 2, in one aspect of at least one embodiment of the present invention, the electronic system 201 alerts or notifies an auditor to inspect certain individual or business 204 based on the auditor's 203 location. For example, and not by way of limitation, if there is a special sporting event (i.e., Super Bowl(D) and the event is being broadcast on TV only at certain region, the electronic system 201 will alert auditors 203 in proximity to that region to pay attention to individual or business 204 playing the special event on TV. The alert or notification can be a mobile text message, email, voice mail, or notification generated by mobile application. The electronic system is capable of locating the auditor's 203 geographical location through the IP address if the auditor is accessing the webpage of the electronic system, or through GPS if the auditor 203 is using mobile devise 202 that has GPS function, or through any similar technology. In another aspect of at least one embodiment of the present invention, the electronic system 201 also allows the auditors 203 to query and verify whether an individual or business 204 has the authorization to use an electronic media content without first receiving notification from the electronic system 201. For instance, if an auditor sees an individual or business 204 is using an electronic media content and the auditor is able to identify the identity of the individual or business 204, the auditor can provide the identity to the electronic system 201 and the electronic system 201 will verify whether the individual or business 204 has the authorization to use the electronic media content 105. FIG. 8 is a process flow diagram showing how the electronic system can interact with the auditor based on the auditor's location. In another aspect of at least one embodiment of the present invention, the electronic system will assign the auditor to audit the use of electronic media on a specific region based on the auditor's location. The electronic system has the option of not to assign the auditor to an area if certain number of other auditors has already been assigned to that area.

Figure 5:
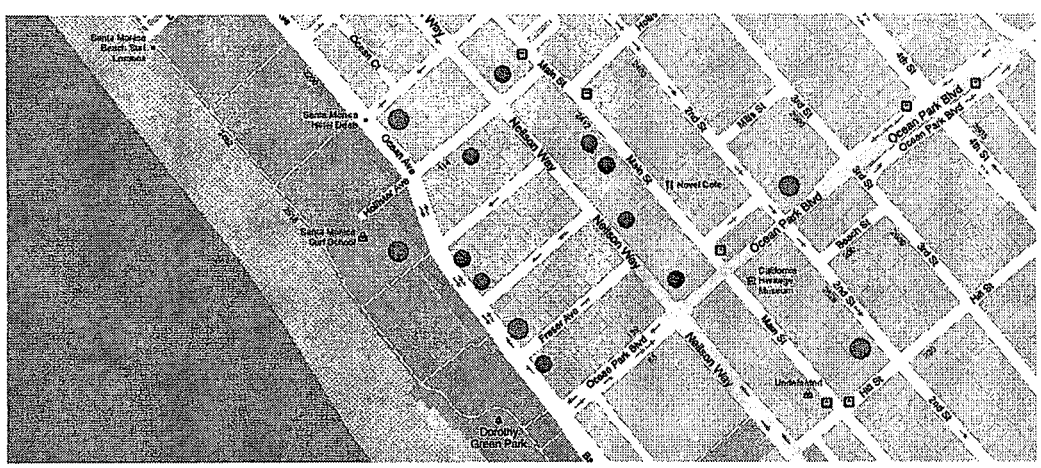
FIG. 5 is an exemplary embodiment of the present invention showing how the list can be incorporated into web map.

There can be numerous ways where auditors can verify whether an individual or business has the authorization to use the electronic media content. In one aspect of at least one embodiment of the present invention, the electronic system provides auditors with geographic locations or ranges of electronic media content. When the auditors see that the electronic media content is being used outside of its geographic locations or ranges, the auditors can immediately tell that the use of the electronic media content is likely unauthorized. The auditors can then confirm their findings with the electronic system. In another aspect of at least one embodiment of the present invention, the electronic system provides auditors with a list showing which individual or business has the authorization to use the electronic media content within the auditors' area. If an individual or business is using the electronic media content but is not on the legal list, the auditors will immediately know that the use of electronic media content is unauthorized. The legal list can also be combined or tied with map applications (i.e., Google® map, Apple® map, etc.) so that auditors can see the exact locations of subscribers in the legal list on the map. For instance, as illustrate in FIG. 5, the list is incorporated into Google® map where different colors of dots can be used to represent which individual or business has subscribed to the electronic media content provider, the type of licensing, or whether a previous subscriber's license has expired.

Figure 3:
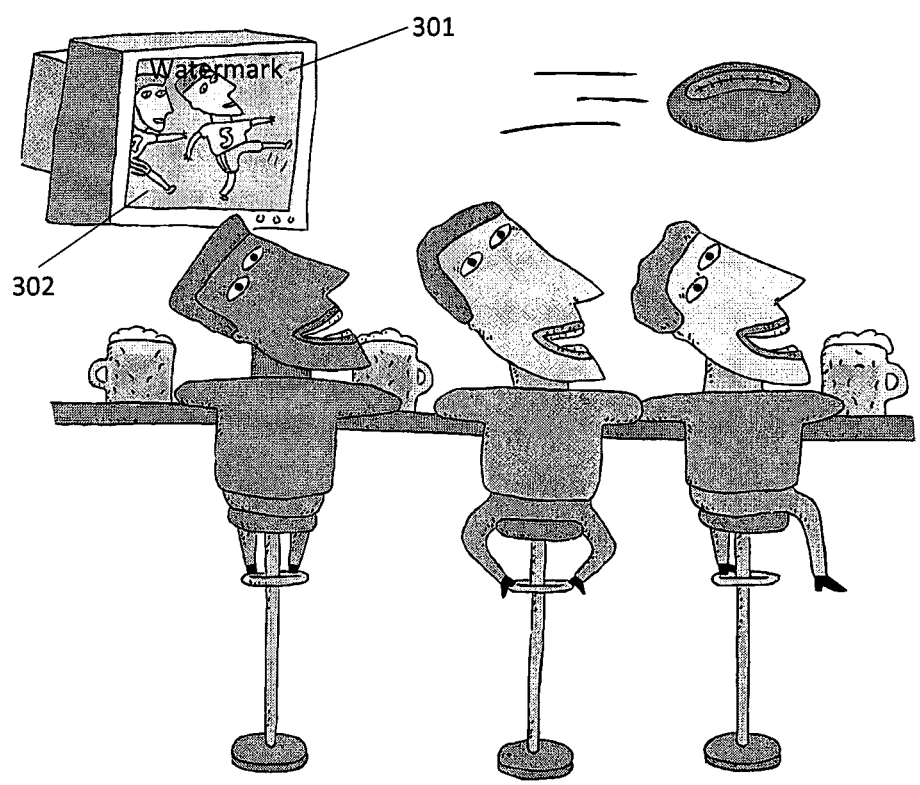
FIG. 3 is an exemplary embodiment of the present invention showing how the auditor can identify the source of a media content.
Figure 6:
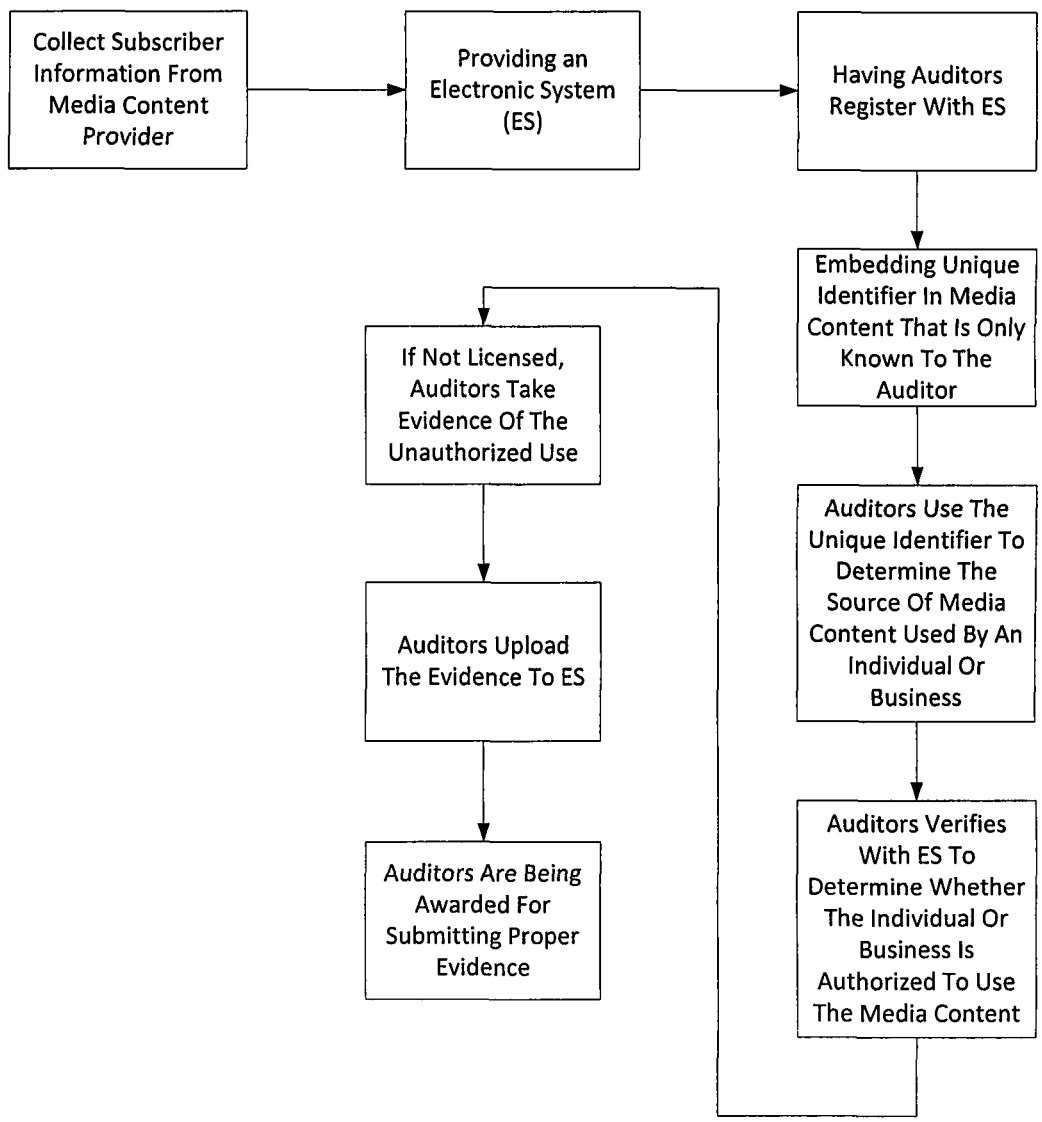
FIG. 6 is a process flow diagram showing an exemplary embodiment of the unique identifier of the present invention.

In yet another aspect of at least one embodiment of the present invention as shown in FIG. 3, the auditors can identify the source of an electronic media content through unique identifier that identifies one or more items of electronic media content, one or more owners of electronic media content or one or more users who have subscribed to use one or more items of electronic media such as watermark 301 on a TV programs 302. The unique identifier also includes, but is not limited to, watermarks or other distortions to the media content, digital signature, digital fingerprint, pixilation, banner or audio signal, image recognition or biometrics or anything else is commonly used in the art or can be embedded or added to in the electronic media content. The unique identifier may also be known only to the auditors and be updated periodically so that the chance of subscribers discovering or tempering with the unique identifier is greatly reduced. Once the source of an electronic media content is identified, the auditors can access the electronic system to verify whether the individual or business using the electronic media content has the authorization or correct license to do so. FIG. 6 is a process flow diagram showing how an auditor can use the unique identifier to detect unauthorized use of electronic media content.

In yet another aspect of at least one embodiment of the present invention, the auditor is provided with special equipment associating with the electronic system that is capable of identifying one or more items of electronic media content, one or more owners of electronic media content or one or more users who have subscribed to use one or more items of electronic media content. The equipment can read information that is being transmitted from any device receiving, transmitting or displaying the electronic media content. For instance, an electronic media content provider may embed a transmitter transmitting licensing and/or subscriber information in their TV box, satellite dish, or any device it provides to its customer for viewing or receiving its media content. The auditor can then retrieve those information through the special equipment and determine whether there is unauthorized use. For example, if the information reveals that the subscriber did not subscribe the electronic media content at that location or the license has already expired, or reveals that the electronic media content should be used residentially but the user is using it commercially, the auditor will immediately know that the use of the electronic media content is unauthorized.

Figure 9:
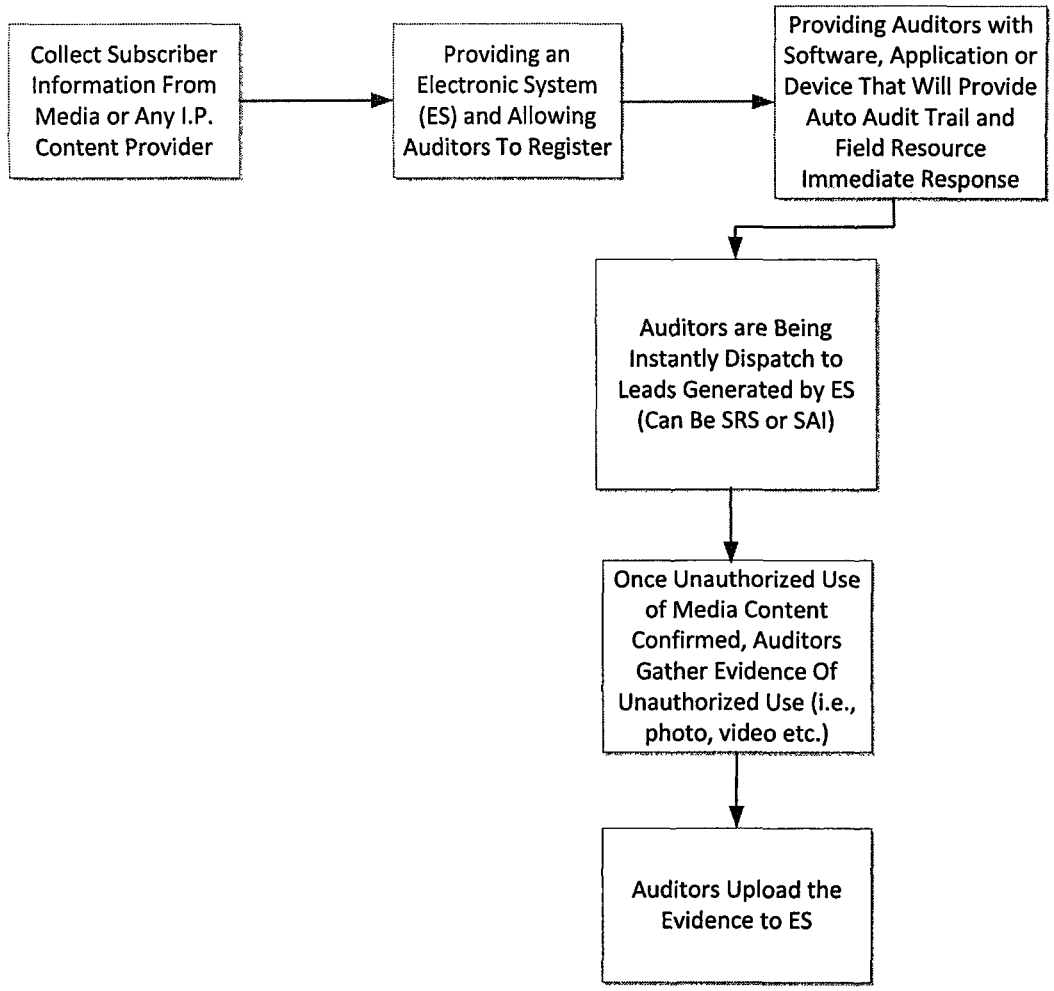
FIG. 9 is a process flow diagram showing how the notification system tracks and dispatches auditors based on their locations.
Figure 10:
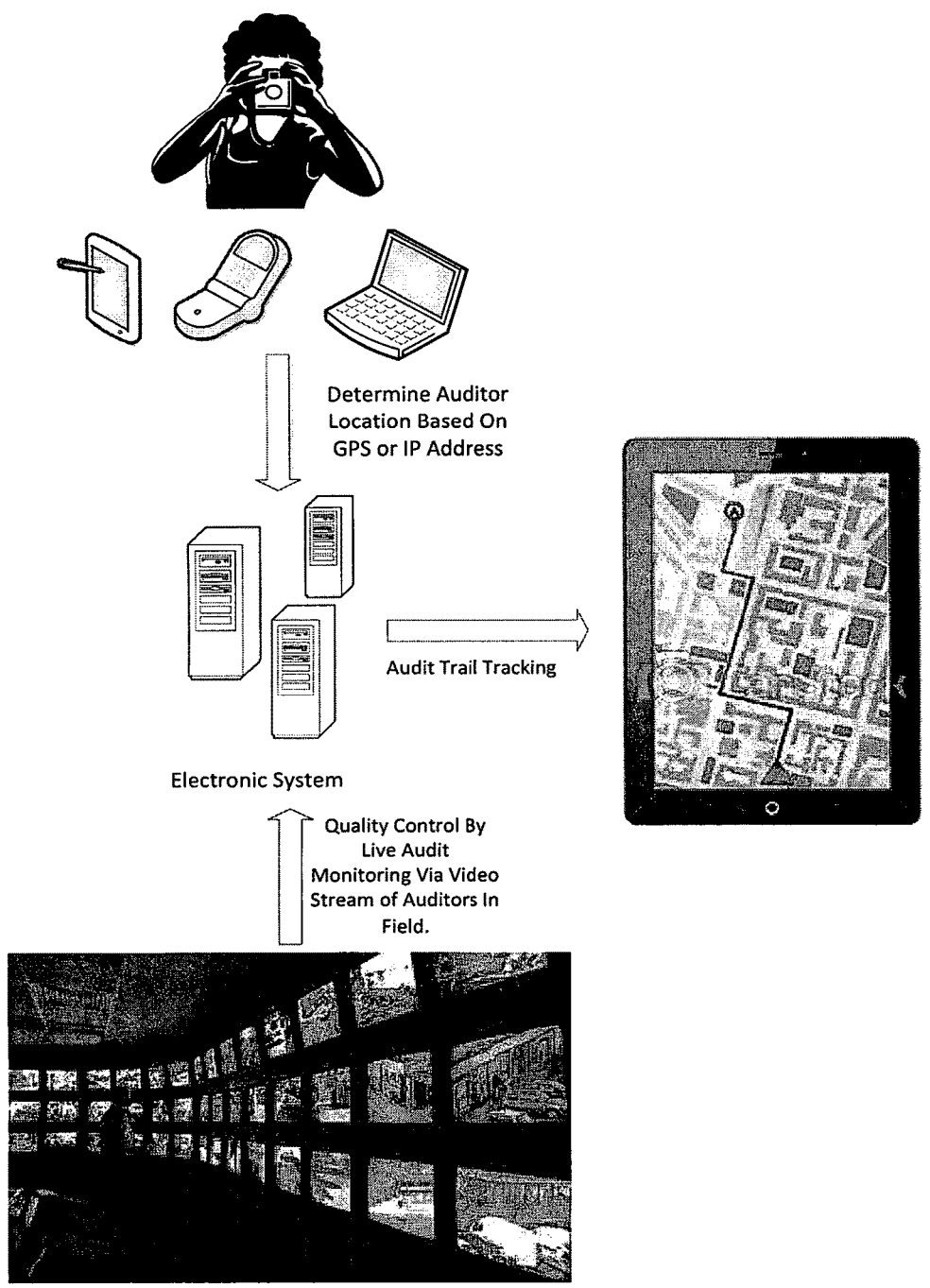
FIG. 10 is an exemplary embodiment of the present invention showing how the quality control team involves in auditing.

In yet another aspect of at least one embodiment of the present invention as shown in FIG. 9, auditors are being provided with software, application or device that will perform auto audit trail tracking and field resource immediate response. The electronic system and/or the software, application or device can track the location of auditors and dispatch auditors based on their locations or based on leads generated by the electronic system which can be realized by technology like Serving Area Interface (SAI), Sequence Retrieval System (SRS) or any other similar technology. As shown in FIG. 10, the electronic system may also provide auditors with trails they should take, and have auditors perform live video recording along the trails. The live video recording will be streamed to the electronic system. Then a quality control team is provided at different location to monitor the process of auditing and provide assistance to the auditors if necessary. In yet another aspect of at least one embodiment of the present invention, the quality control team can also perform live audit via the streamed video recording. By doing this, auditors or users of the software, application or device will not necessarily need to have the knowledge of how to audit a media content as such function will be performed by the quality control team instead.

Figure 4:
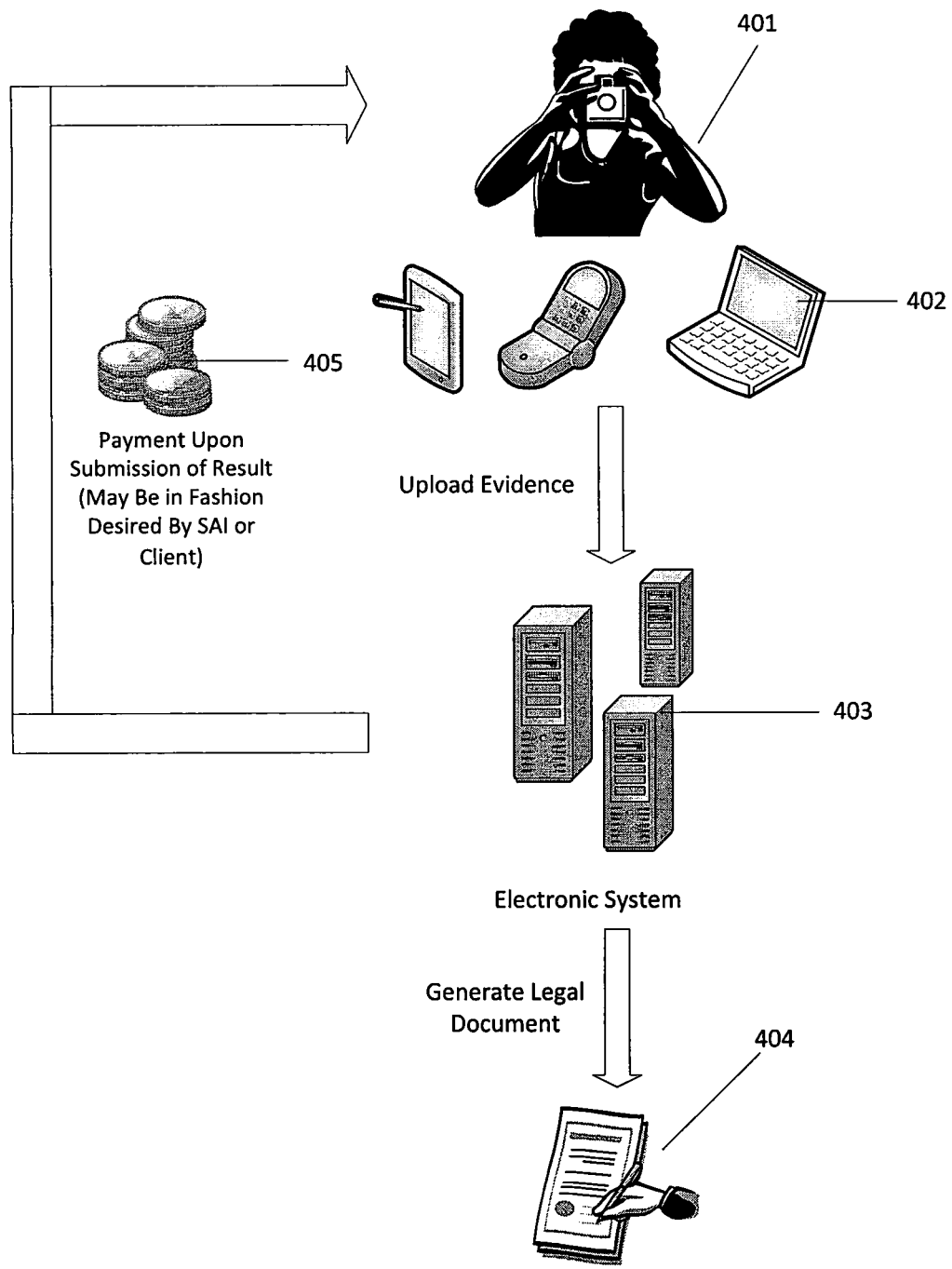
FIG. 4 is an exemplary embodiment of the present providing an incentive, payment or award to the auditor for correctly identifying unauthorized use of electronic media content.

Once the auditors determine that an unauthorized use of electronic media content occurs, the auditors can gather evidence 106 and submit the evidence of the unauthorized use 107 in various forms and means to the electronic system. For instance, as shown in FIG. 4, the auditors 401 can take photos or videos of the unauthorized use and upload them to the electronic system 403 through its website, web application, mobile application, or other similar technology. If the auditors are using mobile devices (i.e., smart phone, PDA, tablet, camera, optical device or tablet computer etc.) 402, the auditors 401 may use the mobile application provided by the electronic system 403 to perform the photo/video taking and uploading tasks.

The electronic system also allows the auditors to provide detail information regarding the unauthorized use, such as identity of individual or business using the electronic media content, or specific location and time of the unauthorized use. If auditors do not provide these information, the electronic system may still be able to determine the time and location of the unauthorized use based on IP address or GPS location of the auditor, the time auditor accessed or provided information regarding unauthorized use of the electronic media content through the mobile application, or the time picture or video evidence was taken by the auditor. If graphical evidence is not available, the auditors may simply provide textual or voice description of the unauthorized use to the electronic system. The electronic system may provide special forms for auditors to fill out such as forms asking auditors to provide specific date, time, location and description of the unauthorized use of electronic media content.

Figure 7:
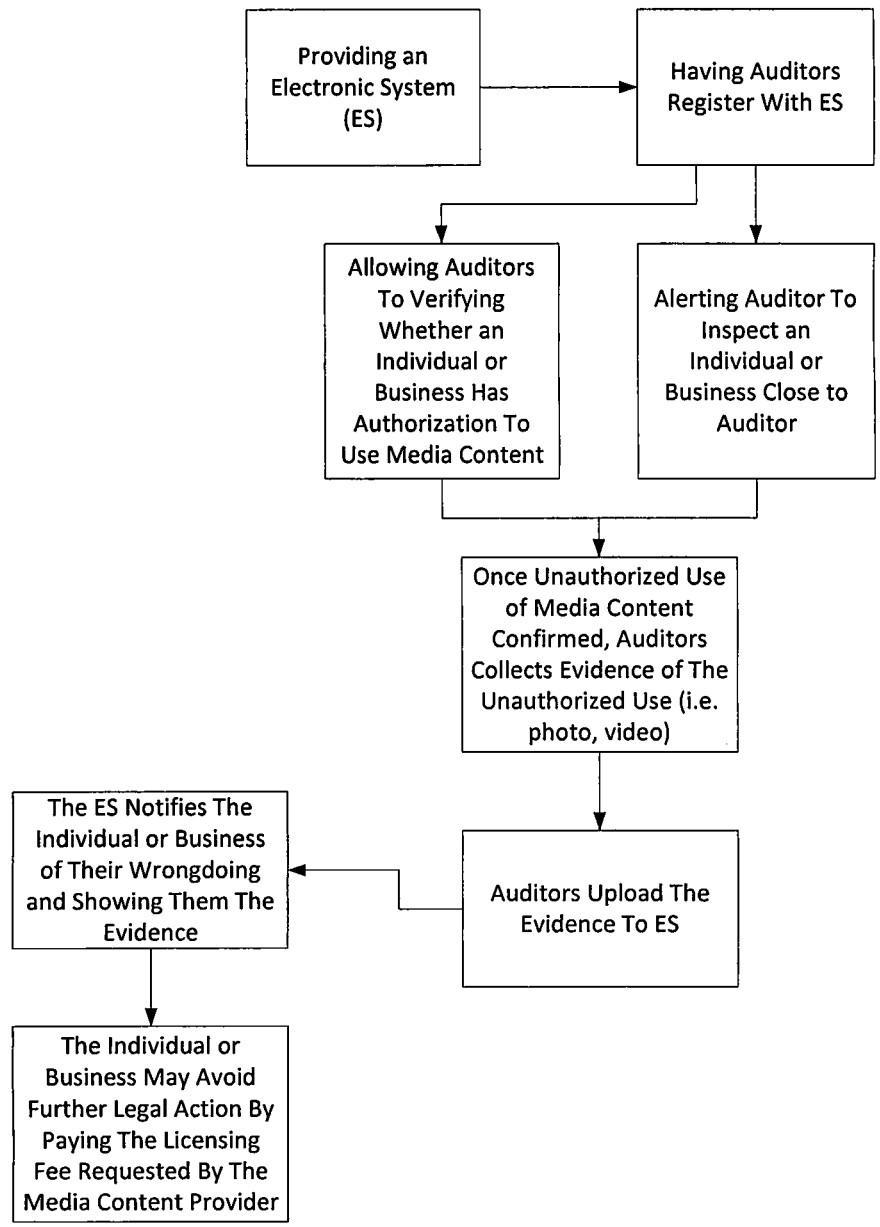
FIG. 7 is a process flow diagram showing an exemplary embodiment of how the present invention can prevent unauthorized use of media content.

After the electronic system 403 receives the evidence from auditors 401 as shown in FIG. 4, the electronic system may compile the evidence into a legal document 404 (i.e., affidavits or declaration of auditors) 108. The auditors can sign the generated legal document 404 electronically if the jurisdiction allows digital signature, or the auditors can submit notarized copy of the legal document when required. The electronic media content providers can then use the legal document against individual or business for unauthorized use of their electronic media content. As shown in FIG. 7, if the identity or contact information of the individual or business is known, the electronic system may also send message (i.e., text message, email, post mail, etc.) to the individual or business warning them of the unauthorized use and requesting them to pay the required licensing fee and/or penalty to avoid legal actions.

In yet another embodiment of the present disclosure, upon detection/confirmation of the unauthorized use of a media content by an individual or business, the electronic system will alert the media content owner/provider of the unauthorized use and provide the content owner/provider with information relating to the unauthorized use (e.g., live evidence of unauthorized use of the media content or account, license, subscription information about the media content). The content owner/provider can then immediately decide whether to block or suspend the individual or business from further access to the media content, thereby immediately correct or resolve any unauthorized or misuse of the media content. In yet another aspect of at least one embodiment of the present disclosure, the media content owner/provider can optionally deliver a warning message that is embedded or streamed with the media content to the individual or business and requesting the individual or business to cease the unauthorized use and/or pay the necessary fees. Since the warning message will be displayed on the media content (e.g., a banner or message box displaying on the media content screen showing that the use of the media content is unauthorized), it can effectively deter users, especially commercial users, from using the media content without authorization.

The present disclosure further provides an incentive, payment or award to the auditor for correctly identifying unauthorized use of electronic media content. For instance, once the electronic system 403 confirms that the evidence submitted by the auditors 401 is proper and authentic, the electronic system awards the auditor with money 405, gift or store credit.

The electronic system will also keep track of tasks performed by auditors and generate lead assignments. For instance, if the electronic system receives a high number of unauthorized use reports from auditors regarding particular individual or business, the electronic system will put the individual or business on a priority list so that electronic media content providers can choose who to prosecute first based on the priority list. The electronic system will also track progress of the audits performed by the auditor and periodically reminds the auditor to complete one or more tasks required by the auditing process. For instance, the electronic system will verify that the information received from the auditor regarding the unauthorized use of electronic media content is complete. If an auditor forgot to upload evidence or some information is missing, the electronic system will notify the auditor of the missing information.

In yet another embodiment of the present disclosure, the system and method can also be used to detect, verify, prevent and correct unauthorized use of non-electronic media contents. Non-electronic media contents include, but are not limited to, trademark, copyright works, software, grey market goods, pharmaceutical drugs and any other consumer product. The electronic system can provide one or more auditors with information regarding a unique identifier that identifies one or more items of non-electronic media content, one or more owners of non-electronic media content or one or more users who have subscribed to use one or more items of non-electronic media content. The auditor can then determine whether a non-electronic media content is being used with authorization based on the unique identifier. For instance, a unique identifier can be embedded or marked on a consumer product where the unique identifier identifies information such as manufacture, destination of sale or authorized vendor of the consumer product. Such information can also be embedded in and disclosed by the bar code of the product if there is one. If the auditor finds that an individual or business is distributing the commercial product without authorization, the auditor can take and submit evidence of the unauthorized use or sale to the electronic system in exchange for reward. Since the owner or authorized distributor of the commercial product can use the evidence against the individual or business for the unauthorized use or distribution, the present disclosure effectively protects and prevents the owner or authorized distributor from unfair competition or loss of revenue resulting from unauthorized/unlawful trading of grey market goods.

Among other things, the present invention provides various benefits and advantages to the electronic media content providers. One benefit of the systems and method of the present disclosure is that it prevents unfair competition. For instance, business entities or individuals who use the electronic media content without authorization can operate their business at lower expense compared to their competitors who lawfully subscribed to the use of the electronic media content. By avoiding paying the required licensing fee, those business entities or individuals may then reduce the cost of their product or service by the amount they saved from the unauthorized use, thereby creating unfair competition to their competitors. Another benefit of the present invention is to prevent or protect late subscribers of the media content from being mistaken for the unauthorized use by the auditors because the electronic system will update the information or database of media content subscribers instantly, thereby resolving latency. The method of the present invention deters and even prevents unauthorized use of electronic media content because it incentivizes the auditors to report unauthorized use of electronic media content with award and there is no limitation on the number of auditors. The mobile application disclosed by the present invention also makes the auditing easy and expedient because almost every person has a smart phone that can take pictures and videos. In addition, when the individual or business sees detailed evidence (i.e., photo, video, etc.) of their unauthorized use of electronic media content, it will prompt them to pay the required licensing fees or to resolve the case quickly and prior to litigation to enforce the rights that were violated.

It should be understood, of course, that the foregoing relates to exemplary embodiments of the invention and that modifications may be made without departing from the spirit and scope of the invention as set forth in the following claims.

What is claimed is:

1. A computer-implemented method comprising:
   establishing an electronic relationship between at least one network connected computer and at least one electronic device;
   receiving from the at least one electronic device evidence of use of media content at a location where the at least one electronic device is located, wherein the evidence comprises of the geographical location of the at least one electronic device, and wherein the at least one electronic device's location changes periodically;
   hashing, encrypting, or processing at least a portion of the evidence of use of media content as the media content is actively playing to obtain a unique identifier, wherein the unique identifier is embedded into or added to each media content file and is updated periodically;
   obtaining information regarding individuals or businesses authorized to use, access, or view the media content with the unique identifier near the geographical location obtained as evidence; and
   sending the information to the at least one electronic device
   providing an incentive, payment, or award to the one or more auditors for correctly identifying the unauthorized use of media content,
   wherein the information includes at least an authorized users list that the auditors can use to help determine authorized use of the content.

2. The computer-implemented method of claim 1, further comprising: providing information regarding the individuals or businesses authorized to use, access, or view the media content with the obtained digital unique identifier near the electronic device's location.

3. The computer-implemented method of claim 1, wherein the electronic device's location is determined via the use of a global positioning system, cell tower triangulation, Wi-Fi triangulation, or internet protocol address.

4. The computer-implemented method of claim 1, wherein the evidence is an audio recording, video recording, or picture of the media content.

5. The computer-implemented method of claim 1, wherein an unauthorized users list is downloaded into a mobile application or software from a network connected computer that the auditors can use to help determine unauthorized use of the content.

6. The computer-implemented method of claim 1, wherein the unique identifier embedded in or added to the media content is unique to the media content, and wherein the unique identifier comprises of a digital signature, digital fingerprint, watermark, pixilation, banner, and any other identifying indicia.

7. The computer-implemented method of claim 1, further comprising: using a processor and memory of at least one network connected computer to determine information regarding whether the geographical location is an authorized location to use, access, view, or broadcast the media content with the unique identifier .

8. The computer-implemented method of claim 1, wherein the unique identifier is unknown to individuals viewing the media content .

9. A computer-implemented method comprising:
   using a processor and memory of at least one network connected computer and the processor and memory of at least one electronic device to establish an electronic relationship between the at least one network connected computer and the at least one electronic device;
   using a processor and memory of the at least one network connected computer to receive from the at least one electronic device evidence of use of media content at a location at the at least one network connected computer, wherein the evidence comprises of a geographical location that is determined via the use of a global positioning system, cell tower triangulation, Wi-Fi triangulation, or internet protocol address and an audio recording, video recording, or picture of the media content;
   using a processor and memory of the at least one network connected computer to hash, encrypt, or process at least a portion of the evidence of use of media content as the media content is actively playing to obtain a unique identifier;
   hashing, encrypting, or processing at least a portion of the evidence of use of media content as the media content is actively playing to obtain a unique identifier, wherein the unique identifier is embedded into or added to each media content file and is updated periodically;
   using a processor and memory of the at least one network connected computer to obtain information regarding individuals or businesses authorized to use, access, or view the media content with the obtained unique identifier near the geographical location obtained as evidence;
   providing information regarding the individuals or businesses authorized to use, access, or view the media content with the obtained unique identifier near the geographical location; and
   providing an incentive, payment, or award to the one or more auditors for correctly identifying the unauthorized use of media content,
   wherein the information includes at least an authorized users that the auditors can use to help determine authorized use of the content,
   wherein the unique identifier is unique to and is embedded into each media content file and updates periodically; and
   wherein the electronic device's location changes periodically.

10. The computer-implemented method of claim 9, wherein the unique identifier embedded in or added to the media content is unique to the media content, and wherein the unique identifier comprises of a digital signature, digital fingerprint, watermark, pixilation, banner, and any other identifying indicia.

11. The computer-implemented method of claim 9, further comprising: using a processor and memory of at least one network connected computer to determine information regarding whether the geographical location is an authorized location to use, access, view, or broadcast the media content with the unique identifier.

12. The computer-implemented method of claim 9, wherein the unique identifier is unknown to individuals viewing the media content.

13. A computer-implemented method comprising:
   using a processor and memory of at least one network connected computer and the processor and memory of at least one electronic device to establish an electronic relationship between the at least one network connected computer and the at least one electronic device;
   using a processor and memory of the at least one network connected computer to receive from the at least one electronic device evidence of use of media content at a location at the at least one network connected computer, wherein the evidence comprises of a geographical location, an audio recording, video recording, or picture of the media content;
   using a processor and memory to hash, encrypt, or process at least a portion of the evidence of use of media content as the media content is actively playing to obtain a unique identifier, wherein the unique identifier is embedded into or added to each media content file and is updated periodically;
   using a processor and memory of the at least one network connected computer to hash, encrypt, or process at least a portion of the evidence of use of media content as the media content is actively playing to obtain a unique identifier; and
   using a processor and memory of the at least one network connected computer to obtain information that includes at least an authorized users list that the auditors can use to help determine authorized use of the content,
   wherein the unique identifier is embedded into or added to each media content file, is updated periodically, and is unknown to individuals viewing the media content; and
   wherein the electronic device's location changes periodically.

14. The computer-implemented method of claim 13, further comprising sending a notification to the one or more auditors of a broadcasted media event in a particular area, the one or more auditors determining if the broadcasted media event is being shown by one of an unauthorized user and an authorized user.

15. The computer-implemented method of claim 14, wherein the notification comprises one of a mobile text message, an email, and a voice mail.

16. The computer-implemented method of claim 13, further comprising:
   sending one or more messages to the unauthorized users of the broadcasted media content; and
   requesting the unauthorized users to pay a penalty for an unauthorized use of the broadcasted media content.

17. The computer-implemented method of claim 13, further comprising:
   identifying an area to assign the one or more auditors; and
   determining a number of auditors that have been assigned in the identified area.

* * * * *